United States Patent
Cook et al.

(10) Patent No.: US 9,985,335 B2
(45) Date of Patent: May 29, 2018

(54) METHODS AND APPARATUS FOR BACKSIDE INTEGRATED CIRCUIT HIGH FREQUENCY SIGNAL RADIATION, RECEPTION AND INTERCONNECTS

(71) Applicant: Texas Instruments Incorporated, Dallas, TX (US)

(72) Inventors: Benjamin Stassen Cook, Dallas, TX (US); Swaminathan Sankaran, Allen, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days. days.

(21) Appl. No.: 14/982,932

(22) Filed: Dec. 29, 2015

(65) Prior Publication Data

US 2017/0187094 A1    Jun. 29, 2017

(51) Int. Cl.
*H01Q 1/22* (2006.01)
*H01Q 13/20* (2006.01)
*H04B 10/90* (2013.01)

(52) U.S. Cl.
CPC ........... *H01Q 1/2283* (2013.01); *H01Q 13/20* (2013.01); *H04B 10/90* (2013.01)

(58) Field of Classification Search
CPC .................................................. H01C 1/2283
See application file for complete search history.

(56) References Cited

U.S. PATENT DOCUMENTS

| | | | |
|---|---|---|---|
| 6,061,026 A | * | 5/2000 | Ochi ............... H01Q 9/285 343/700 MS |
| 6,752,931 B2 | | 6/2004 | Dewa |
| 8,450,687 B2 | | 5/2013 | Lampin et al. |
| 8,693,468 B2 | | 4/2014 | Warke et al. |
| 2011/0156977 A1 | * | 6/2011 | Diaz ............... H01Q 9/0421 343/772 |
| 2011/0163457 A1 | * | 7/2011 | Mohan ............ H01L 21/4853 257/774 |
| 2011/0260943 A1 | | 10/2011 | Felic et al. |
| 2014/0254979 A1 | | 9/2014 | Zhang et al. |
| 2016/0036200 A1 | * | 2/2016 | Tateishi ........... H01S 5/1046 372/4 |

* cited by examiner

*Primary Examiner* — David Porta
*Assistant Examiner* — Hugh H Maupin
(74) *Attorney, Agent, or Firm* — Michael A. Davis, Jr.; Charles A. Brill; Frank D. Cimino (57) ABSTRACT

In an example arrangement an apparatus includes a semiconductor substrate having a front side surface including circuitry and a backside surface opposing the front side surface; a plurality of metal conductors formed over a front side surface of the semiconductor substrate; at least one cavity opening etched in a backside surface of the semiconductor substrate; and a radiator formed in a portion of the metal conductors and configured to radiate signals through the cavity opening in the backside surface. Methods and additional apparatus arrangements are also disclosed.

38 Claims, 11 Drawing Sheets

METHODS AND APPARATUS FOR BACKSIDE INTEGRATED CIRCUIT HIGH FREQUENCY SIGNAL RADIATION, RECEPTION AND INTERCONNECTS

TECHNICAL FIELD

The present application relates in general to integrated circuits and integrated wave structures, and in particular to building backside wave structures for high frequency radiation and reception in semiconductor devices.

BACKGROUND

As used in the present application, the term "terahertz" is understood to cover electromagnetic transmission with wavelengths of approximately 3000 um to 10 um corresponding to the range of frequencies from approximately 0.1 THz to approximately 30.0 THz.

Coupling millimeter wave, sub-THZ and THz signals from an integrated circuit to an antenna or interconnect can be problematic in prior known solutions due to three key issues.

The first issue involves the losses that occur in back-end materials due to skin depth in metals, and dielectric losses in oxides and nitrides. To achieve high gain antennas, or to form high frequency inter-chip interconnects, large structures are required in the back end processing with respect to wavelength, which greatly increases conductor and dielectric loss.

Figure 1A:
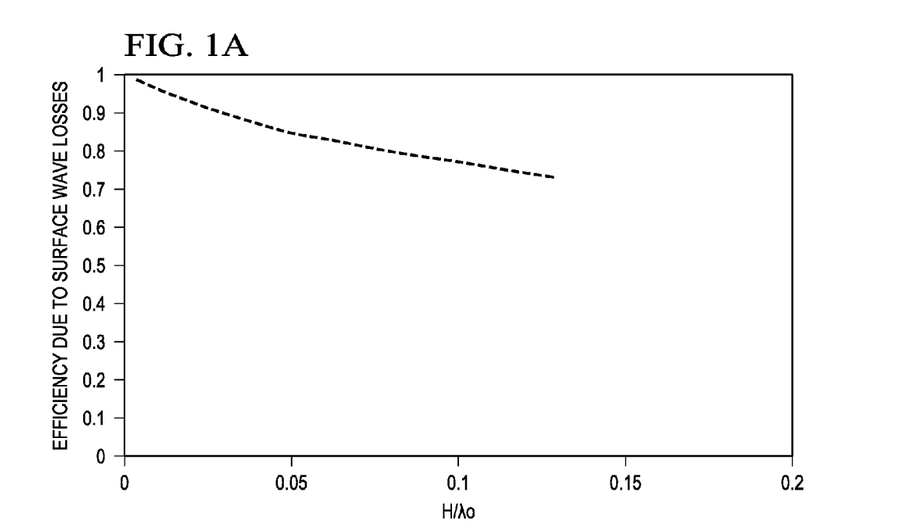
FIGS. 1A and 1B illustrate in two views signal efficiency showing losses in a prior art structure with a surface wave effect.
Figure 1B:
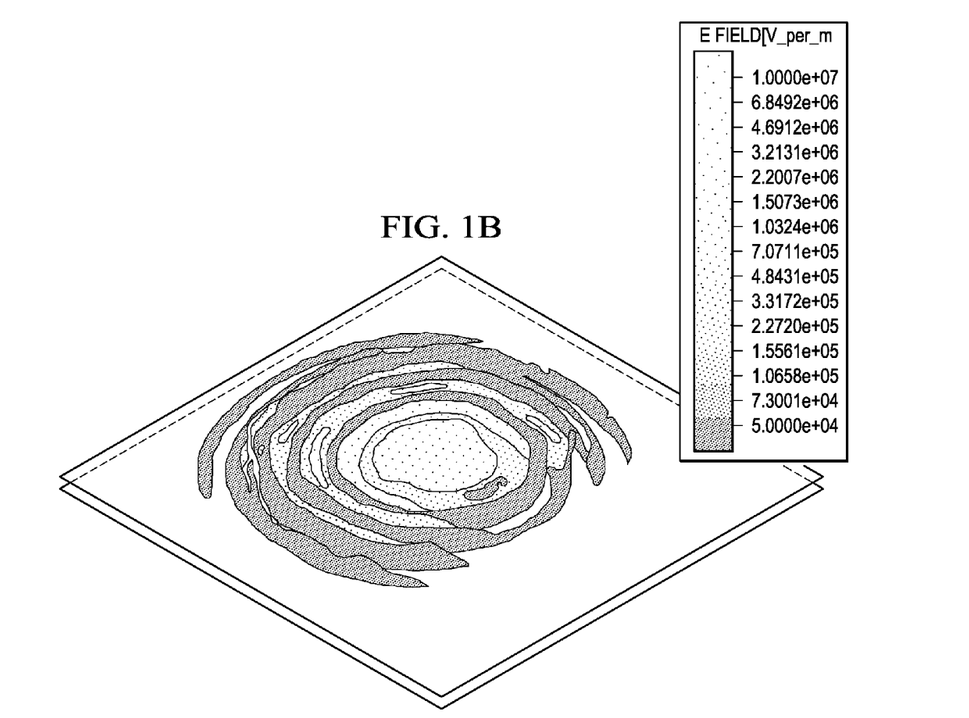

The second issue involves surface waves, which are propagating modes which appear when a dielectric on a metal interface is large with respect to the signal wavelength. The surface waves cause signal loss (efficiency loss) in antennas and interconnects. FIGS. 1A and 1B depict a graph of the efficiency (shown on the vertical axis of FIG. 1A) where H is the thickness of the dielectric over the top of a metal M1, and the ratio H/lambda_o is shown on the horizontal axis. A typical back end dielectric is 6 microns thick, which is 0.02 (H/lambda_o) at a 1 THz frequency, as shown in FIG. 1A this leads to 10% power loss due to surface waves in patch antennas (similar in a transmission line in the back end). FIG. 1B illustrates the surface wave effects in an example structure showing the energy being transferred as waves along the surface of the dielectric layer, and thus not being efficiently transmitted away from the structure.

The third issue involves the top level metal structures and dielectric materials typically in use for conventional semiconductor devices. These materials, when used for radiators or coupling structures, are too lossy for the efficient radiation and reception of THz frequency signals.

In one prior known approach to address at some of the known problems disclosed in U.S. Pat. No. 8,450,687 (the "'687 patent"), an antenna is integrated directly on the integrated circuit (IC). In the '687 patent, an antenna is formed on the IC with the intent of radiating the energy on the circuit side or top-side of the IC, sometimes referred to as the "front" side. The antenna structure described in the '687 patent is formed in a manner that lowers production costs over prior approaches, in that the antenna build can be incorporated into the IC building process, thus saving additional costs of micromachining as in prior approaches. Another feature of the approach of the '687 patent is that the antenna used improves the radiating efficiency over the prior known planar styled integrated antennas. However, additional problems remain.

Figure 2A:
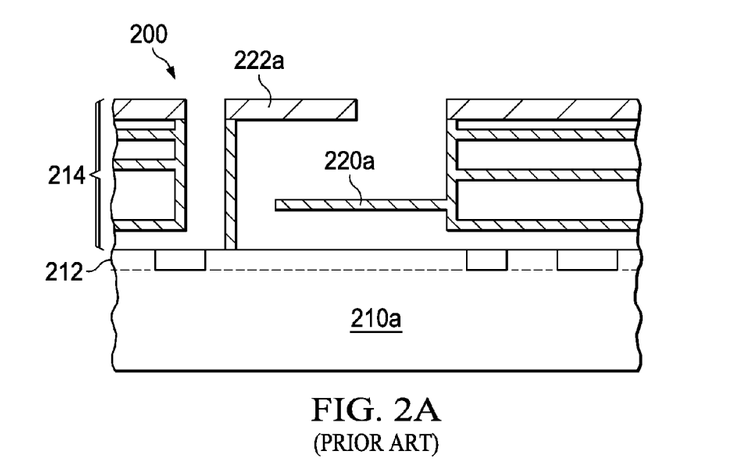
FIGS. 2A and 2B illustrate in two views a prior art top-side antenna integrated with an IC.
Figure 2B:
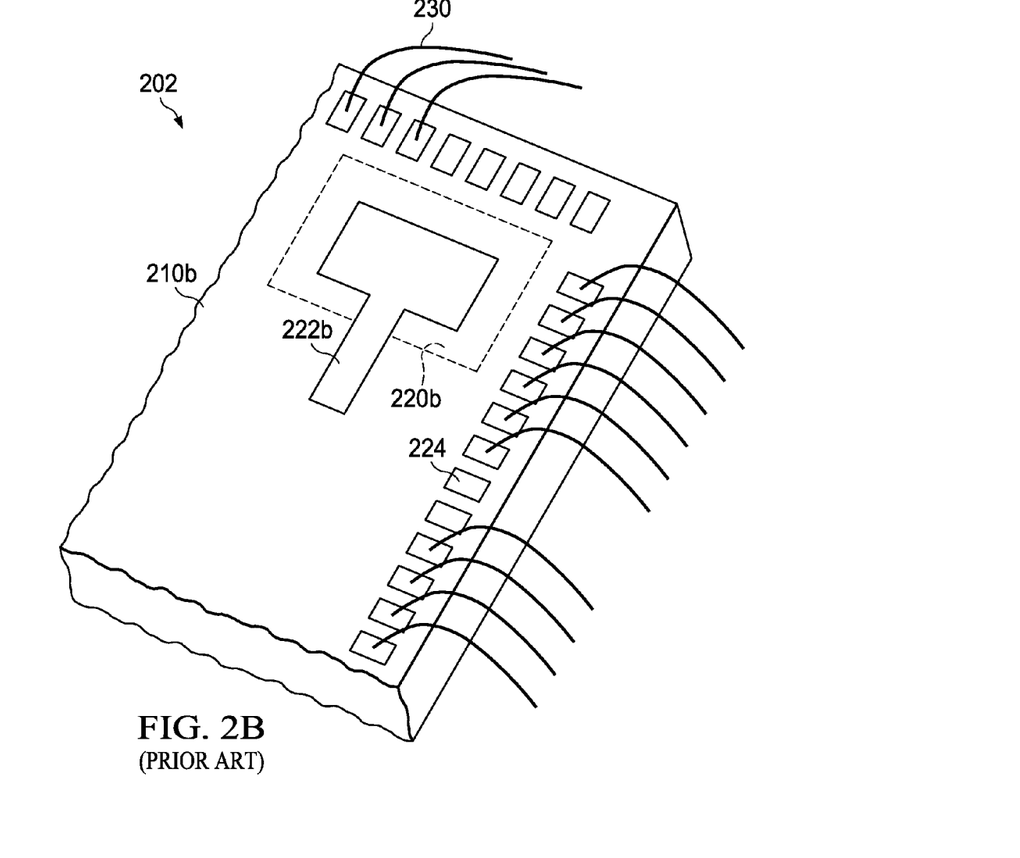

FIGS. 2A and 2B illustrate a prior known approach top-side antenna built within an IC fabrication system. In FIG. 2A, a cross sectional view 200 depicts a semiconductor substrate 210a, the doped surface region forming an active area 212, and the metal conductor stack 214. Within the metal conductor stack, a ground plane 220a and an antenna 222a are formed with the antenna 222a at the uppermost portion of the metal conductor stack 214. The metal conductor stack 214 can be formed from a multiple level metal structure with conductors formed at levels separated by dielectric layers such as are formed over the surface of semiconductor substrates in integrated circuit fabrication. In FIG. 2B, a top view 202 of this structure is illustrated again showing the semiconductor substrate 210b, the ground plane 220b and the antenna structure 222b. Additionally, a number of bond pads 224 and bond wires 230 are shown to help illustrate that this antenna structure is formed on the top or circuit side of a semiconductor substrate such as a silicon, silicon germanium, gallium arsenide or other semiconductor wafer. With the antenna 222a formed on the top-side of the semiconductor substrate, the energy radiates upwards away from the top side of the wafer or substrate 210b.

Figure 3:
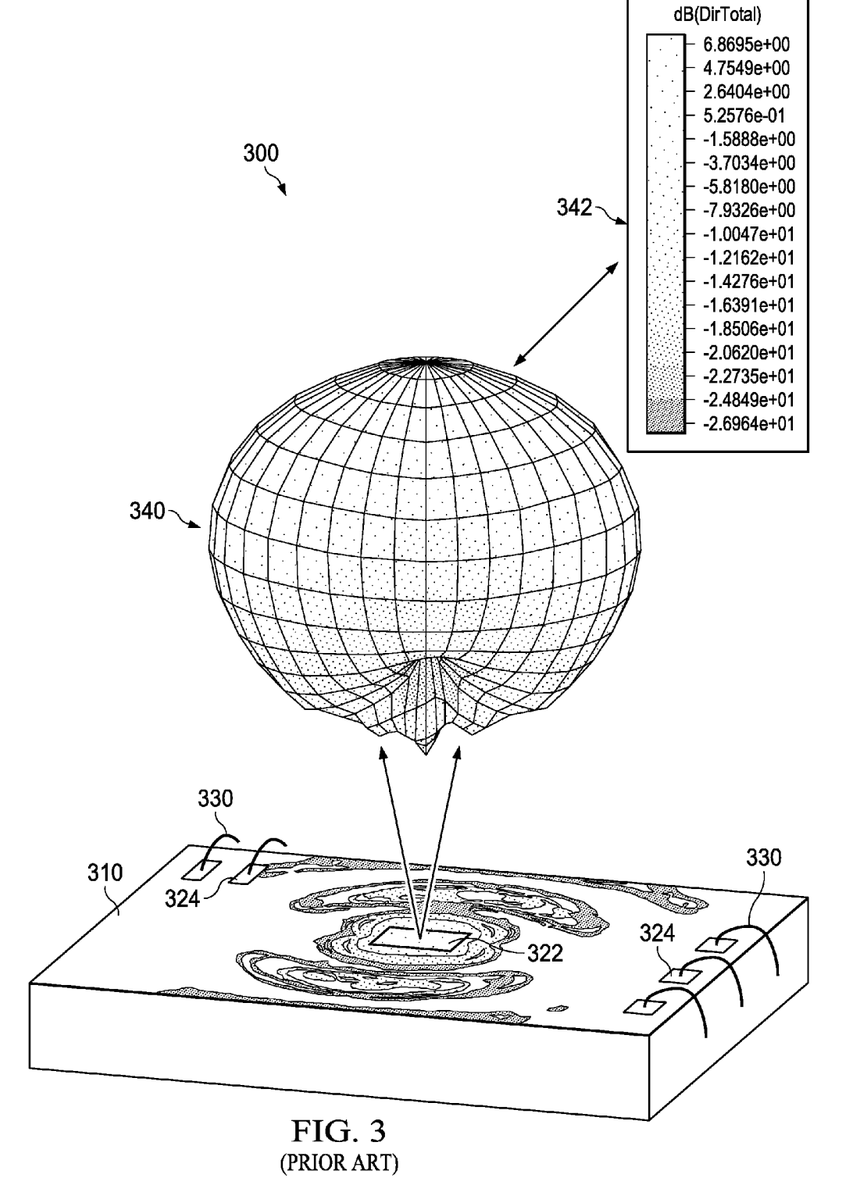
FIG. 3 depicts a prior art top-side antenna and a balloon graph illustrating signal strength radiated from the antenna.

FIG. 3 depicts in 300 a prior known approach a top-side antenna such as is depicted in FIGS. 2A and 2B in operation radiating signals, and a corresponding balloon graph 340. Illustrated in FIG. 3 is an arrangement 300 including a wafer or semiconductor substrate 310, a top-side antenna 322, a plurality of bond pads 324, and a plurality of bond wires 330. The balloon graph 340 represents the simulated energy radiated by the top-side antenna 322 in operation. In this arrangement 300, the peak gain was found in simulations to be approximately 7 dB as indicated by the graph scale 342 in FIG. 3 and the balloon graph 340.

Continuing improvements are therefore needed for methods and for couplers or antennas that are compatible with commercial semiconductor processes and that can efficiently transmit and receive signals at THz and sub-THz frequencies. A higher gain antenna is desirable as well as the ability to more efficiently couple the radiated energy to other THz components.

SUMMARY

Arrangements of the present application overcome the deficiencies of the prior art and expand the ability to efficiently radiate and detect THz frequency radiated energy from radiators or coupling structures fabricated on integrated circuits, wafers, or semiconductor substrates.

In an example arrangement an apparatus includes a semiconductor substrate having a front side surface including circuitry and a backside surface opposing the front side surface; a plurality of metal conductors formed over a front side surface of the semiconductor substrate; at least one cavity opening etched in a backside surface of the semiconductor substrate; and a radiating or coupling structure formed in a portion of the metal conductors and configured to radiate signals through the cavity opening in the backside surface.

In particular, an integrated antenna in the present application will provide sub-THz and THz radiation for receiving or transmission directed from the backside of a semiconductor substrate or wafer by building the antenna portion with a cavity formed on the backside of the IC.

Building the antenna within the backside of the substrate allows for uniform parallel orientation of the radiating structure to the ground plane as well as accurate spacing between the radiator and a ground plane reflector which intensifies the radiated signal, improving the gain. Additionally, the arrangements of the present application provide antennas and coupling structures for high frequency signals that are mechanically robust and which are compatible with existing semiconductor fabrication processes.

Additional arrangements that form additional aspects of the present application create waveguides within a wafer or substrate enabling the efficient coupling of the THz energy to other ICs, to packages, to redistribution layers, to waveguides, or to other points on the same IC.

BRIEF DESCRIPTION OF THE DRAWINGS

For a more complete understanding of the illustrative examples of aspects of the present application that are described herein and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the illustrative example arrangements and are not necessarily drawn to scale.

DETAILED DESCRIPTION

The making and using of various example illustrative arrangements that incorporate aspects of the present application are discussed in detail below. It should be appreciated, however, that the illustrative examples disclosed provide many applicable inventive concepts that can be embodied in a wide variety of specific contexts. The specific examples and arrangements discussed are merely illustrative of specific ways to make and use the various arrangements, and the examples described do not limit the scope of the specification, nor do they limit the scope of the appended claims.

For example, when the term "coupled" is used herein to describe the relationships between elements, the term as used in the specification and the appended claims is to be interpreted broadly, and while the term "coupled" includes "connected", the term "coupled" is not to be limited to "connected" or "directly connected" but instead the term "coupled" may include connections made with intervening elements, and additional elements and various connections may be used between any elements that are described as "coupled."

Various illustrative examples are provided herein for the purposes of explanation and discussion of the arrangements. These illustrative examples are not to be read as limiting the scope of this application or the appended claims, and many alternative arrangements that form additional aspects of the present application are contemplated by the inventors and these alternative arrangements also fall within the scope of this application and within the scope of the appended claims or additional claims that may be added.

Arrangements of the present application recognize the possibilities for a structure which inverts the antenna structure over the prior known approaches in order to radiate energy out of the backside of a semiconductor substrate or wafer. In various arrangements, different etching techniques and processes are used to form various cavities or waveguides in the back side of the wafer or semiconductor substrate and are arranged underneath and proximal to the antenna or coupling structure in different patterns. The arrangements of the present application provide a means to improve the gain characteristics of the radiated energy over the prior known approaches, as well as enabling additional coupling structures and transmission methods not available in prior known approaches to fabricating sub-THz and THz antennas. Arrangements in the present application provide coupling structures for guiding THz signals from one point to another in a non-radiating, waveguide structure. Because the antenna or coupling structure is formed on the backside of the wafer, the losses incurred by prior known approach top side antennas are avoided. Additional advantages accrue by use of the novel arrangements as is further explained below. The cavities can be arranged as waveguides or antenna horns. Redistribution layers or THz beamforming techniques can be achieved by controlling of the spacing between the antenna or coupling structure and electrical or magnetic reflectors, and by varying the shapes of the cavities including by controlled etching of the semiconductor substrate material, and by thinning or controlling the thickness of the semiconductor substrate or wafer. Use of the arrangements of the present application unexpectedly provide an efficient radiator and detector for sub-THz and THz frequency signals that cannot be achieved using prior known approaches. THz signaling using coupling structures and cavities or waveguides can be achieved for on-die, die-to-die, or die-to-package connections at high frequency that were previously unavailable.

Figure 4A:
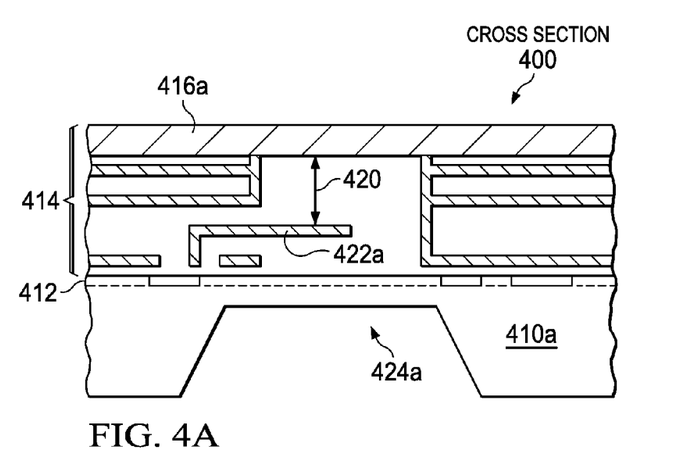
FIGS. 4A, 4B and 4C illustrate an antenna arrangement built within a CMOS process with a cavity formed in the backside of a semiconductor substrate.
Figure 4B:
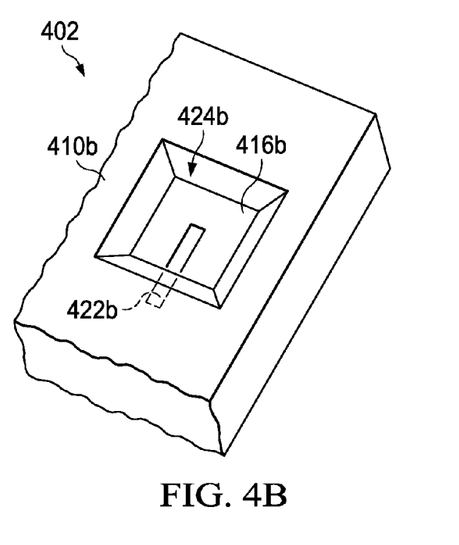
Figure 4C:
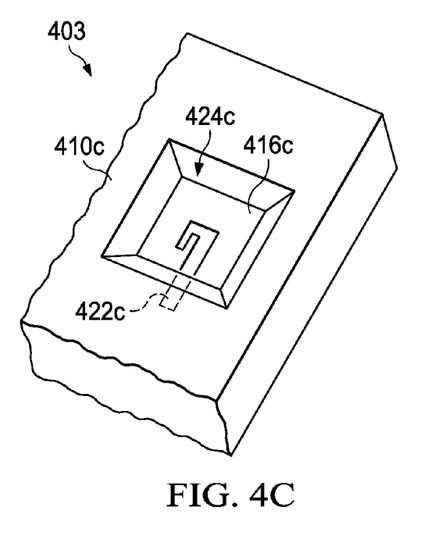

FIGS. 4A-4C illustrate in non-limiting illustrative example arrangements a THz antenna built within a semiconductor process with a cavity opening or waveguide formed in the backside of the wafer substrate. FIG. 4A illustrates in a cross section 400 a wafer 410a fabricated with known CMOS processing with a cavity opening or waveguide 424a. A region 412 at the surface of the substrate 410a can contain active or passive circuit components. In an example arrangement formed using a standard MOS semiconductor process, CMOS components including, for example active circuitry formed from MOS transistors, and in some arrangements, passive circuitry such as capacitors, resistors and the like, can be formed in active region 412. Ion implantation, doping, and diffusion processes can be used for example to form source and drain regions spaced by a channel to form active MOS devices in region 412. The metal conductor system 414 formed on the surface of the semiconductor substrate 410a contains at least one antenna structure 422a and a corresponding reflecting plane 416a which is separated from the antenna by a distance 420. Other portions of the metal conductor system can be used to couple components formed in or on the wafer, such as transistors, capacitors, and the like. The metal conductor system 414 can be formed from multiple level conductors electrically isolated by dielectric layers such as silicon oxide, silicon nitride, silicon oxynitride, carbon containing dielectrics, and the like. Amplifier circuitry can be formed in the active region 412 and the amplifier circuitry can be coupled to the antenna structure 422a, for example, and receiver circuitry can also be formed in the active region 412 and coupled to the antenna 422a for receiving radiated signals.

Various physical implementations of the antenna 422a are contemplated by the inventors of the present application where the signal radiates through the cavity opening or waveguide 424a on the backside of the wafer. Two such examples are illustrated in FIGS. 4B and 4C. In FIG. 4B, a bottom view 402 depicts an electric field radiator utilizing the metal stack illustrated in FIG. 4A. In this example arrangement, a waveguide or cavity opening 424b has been etched into the backside of the wafer substrate 410b at a position corresponding to the antenna 422b. In some additional alternative arrangements that form additional aspects of the present application, the opening 424b can extend entirely through the semiconductor substrate exposing the antenna to the opening, in other additional arrangements, a portion of the semiconductor substrate 410a or 410b can be retained. In FIG. 4B, 416b illustrates a metal portion of the metal structure formed above (shown beneath the antenna in this bottom view) the antenna 422b which, in this example arrangement, serves as a reflector to direct radiated energy from the antenna 422b out the backside opening. By spacing the reflector formed in metal 416a from the antenna 422a, a constructive interference arrangement can be created. The spacing 420 is determined by the wavelength λ/4, of the signal being radiated. In one arrangement, the reflector 416b is an electrical reflector such as a ground plane, and it will reflect the radiated electromagnetic signals with unity gain and 180 degree phase shift. By spacing the antenna 422a at a distance 420 that corresponds to λ/4, a 90 degree phase shift occurs between the antenna and the reflector 416a. The signal is then reflected with an additional 180 degree phase shift and undergoes another 90 degree phase shift traveling between the reflector 416a/416b and the antenna 422a/422b. In this arrangement the total phase shift is 360 degrees at the antenna, so that the reflected signal is constructively interfering with the radiated signal at the antenna 416a/416b, thus gain is accomplished. The distance 420 can be adjusted for the wavelength (the inverse of the frequency) of the signal being radiated to achieve constructive interference/gain. Achieving gain of THz frequency signals is therefore easily accomplished using the arrangements of the present application. This advantageous result is in sharp contrast to the prior known approaches, where gain is difficult or impractical to obtain for the sub-Thz and Thz frequencies of interest, so that the radiated signals exhibit loss, and not gain. In the case of a patch antenna arrangement, the radiator can be as close as lambda/100 to the ground plane to still radiate efficiently. Coupling structures which are not radiators or antennas but are instead conductors that transmit signals using the backside cavity structure can also be as close lambda/100 to a ground plane and perform efficient transmission.

Another arrangement of the present application is illustrated in FIG. 4C. In FIG. 4C, a bottom view 403 of a magnetic field coupled antenna 422c is depicted with a cavity opening or waveguide 424c etched in the wafer substrate 410c. The etched opening can extend through the substrate to expose antenna 422c; however in alternative arrangements a portion of the semiconductor substrate 410c can be retained at a small thickness. The signal reflector 416c is illustrated beneath the antenna 422c and will be spaced from the antenna as indicated by the distance 420 as in cross section view 400 in FIG. 4A.

When a magnetic reflector plane is used instead of an electrical reflector, different phase shifts occur. A perfect magnetic reflector has a reflection that is unity gain and has a zero degree phase shift. Thus in contrast to the electrical reflector arrangement described above. In the example depicted in FIG. 4C, when a magnetic reflector is used, the spacing 420 can be quite close because the reflected electromagnetic energy will constructively interfere with the energy radiated from the antenna 422c, and thus gain can again be accomplished using the arrangements. This approach is also applicable to the arrangements of FIGS. 4A and 4B to obtain gain in the novel arrangements.

The magnetic reflector 416c can be implemented using an artificial magnetic reflector by patterning a metal pattern above the antenna to create a magnetic reflector. The antenna or coupling structure 422c can be, for example, implemented in the first level metal layer in a semiconductor process, so that is proximal to the surface of the semiconductor substrate, and the electrical reflector 416b in FIG. 4B, or the magnetic reflector 416c of FIG. 4C, can be implemented in an upper level of the metal structure. Various patterns can be used to create the reflector plane, for example, if an artificial magnetic reflector is desired.

In conventional semiconductor processes the metal structure 414 in FIGS. 4A-4C can be formed in the "back end of the line" or "BEOL" phase of the semiconductor processes. The conductors in the metal structure 414 can be formed from copper and copper alloys, for example, using single damascene or dual damascene processes. Such processes are increasingly used to form metal conductors after the implant, diffusion and anneal processes are used to form the doped regions in the active region 412 in a "front end" process, for example. In addition, backside processing is becoming more prevalent, for example to form deep openings for through silicon vias (TSVs). In the arrangements of the present application, the cavity openings or waveguide openings formed extending into the semiconductor substrate from the backside are also performed in (or, in an alternative approach, can be performed after) the BEOL processes. Wet etches, such as KOH, TMAH, HF and other chemical wet etches for semiconductor material removal can be used to form cavity openings with sloping sides to form antenna horn structures in various ones of the arrangements. For a silicon substrate, a KOH chemistry can form a sloped sidewall in the opening having an angle of about 57 degrees to the horizontal, for example. In another arrangement, a TMAH wet etch can be used form a cavity opening having an angle of about 61 degrees, for example.

As is further described below, waveguide or cavity openings with vertical sidewalls can be formed using deep reactive ion etching (DRIE) processes. Simulations can be used to determine horn shapes for antennas, or waveguides that have efficient transmission for radiated energy at a particular frequency. Beamforming techniques can be used to increase the efficiency and output of the antennas. Also, the simulations can indicate shapes that are efficient for receiving radiated signals at a chosen frequency (receiving and transmitting are reciprocal, the radiation and reception pattern are always the same). As an additional alternative, a stepped opening can be formed by repeating DRIE or wet etch processes with smaller and smaller patterns.

Further alternative shapes can be achieved by using different wafer thicknesses. Mechanical thinning from the backside of the wafer or "backgrinding" can be used to thin the wafers to further shape the cavities to optimize radiation and detection of electromagnetic energy at the chosen frequencies. Backgrinding can be used to remove a controlled thickness of semiconductor material to thin a wafer. Additional removal methods that can be used include using chemical mechanical polishing (CMP) processes or combinations of CMP and mechanical backgrinding, for example.

The semiconductor substrate can be, in an example arrangement, a wafer as is commonly used in semiconductor processing, or a portion thereof. The semiconductor substrate can be silicon in one example arrangement. In additional alternative arrangements that are contemplated by the inventors as aspects of the present application, the semiconductor substrate can be of other known useful materials such as gallium arsenide, silicon germanium, gallium nitride, indium phosphide, indium arsenide or other "III-V" materials that are used or are known to available for semiconductor processing.

Figure 5A:
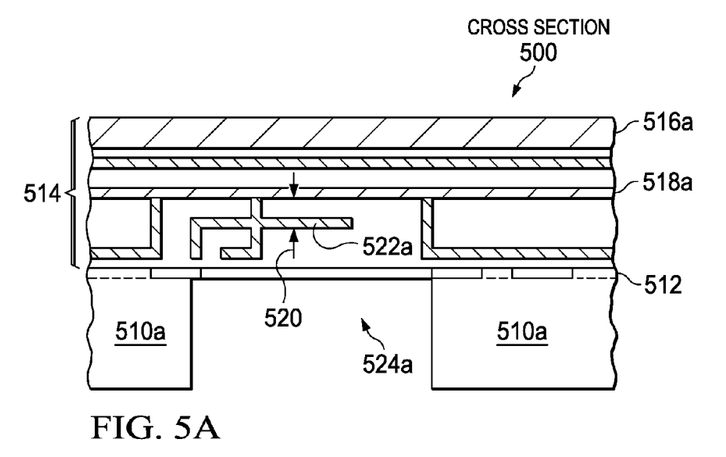
FIGS. 5A, 5B and 5C illustrate another antenna arrangement built with a waveguide formed in the backside of a semiconductor substrate.
Figure 5B:
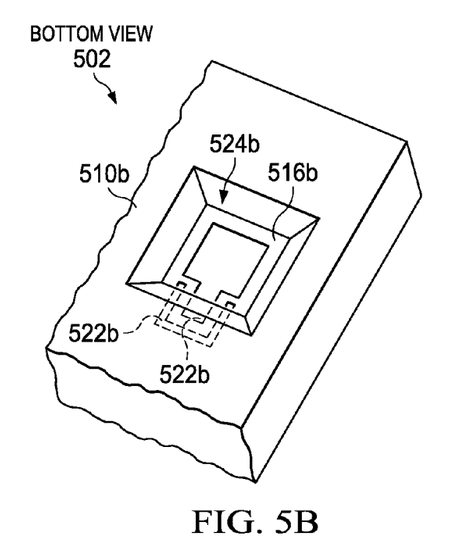
Figure 5C:
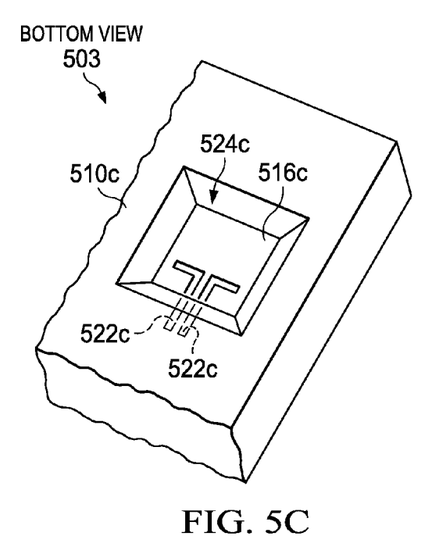

FIGS. 5A, 5B and 5C illustrate in three different views alternative arrangements that include a THz antenna built within a semiconductor substrate in a semiconductor process, with a waveguide formed in the backside of the wafer substrate. In FIG. 5A, an illustrated cross sectional view 500 depicts a semiconductor substrate 510a with a waveguide 524a. A region 512 in the surface of the semiconductor substrate or wafer contains circuit components for the integrated circuit. The metal system 514 fabricated on the substrate surface contains an antenna structure 522a and a ground plane 518a which is separated from the antenna 522a by a distance 520. In this arrangement of the present application, the distance 520 has a range of λ/10 to λ/8. By selecting the distance labeled 520 for a particular frequency of interest, destructive interference can be avoided and in some arrangements, constructive interference can be utilized to add gain to the signal radiated from the antenna 522a, which is an advantage recognized by the inventors for the novel arrangements over prior known approaches. Gain is achievable using the arrangements of the present application for frequencies such as THz and sub-THz frequencies where there are no practical ways to attain gain using the prior known approaches.

Various antenna structures and various coupling structures are contemplated by the inventors with the signal radiating through the backside opening or waveguide or being detected through the backside opening or waveguide. Two additional examples are illustrated in FIGS. 5B and 5C. In FIG. 5B a bottom view 502 depicts, in one example arrangement, a THz antenna 522b that is viewed through the back side waveguide 524b which is etched in the wafer substrate 510b. The ground plane 516b is depicted behind the antenna and is separated by a distance 520 as indicated in cross section 500 in FIG. 5A. The antenna 522b can also be arranged for other frequencies, for example, for millimeter wave or sub-THz frequencies. The antenna 522b can also be arranged to detect or receive signals.

An additional arrangement of the present application can be seen in the bottom view 503 in FIG. 5C where a THz antenna 522c is depicted as seen through a waveguide opening 524c etched on the backside of the semiconductor substrate into, or completely through, the substrate 510c. Behind the antenna in FIG. 5C, the ground plane 516c is depicted and it is separated by a distance 520 as indicated in cross section 500 in FIG. 5A.

Figure 6:
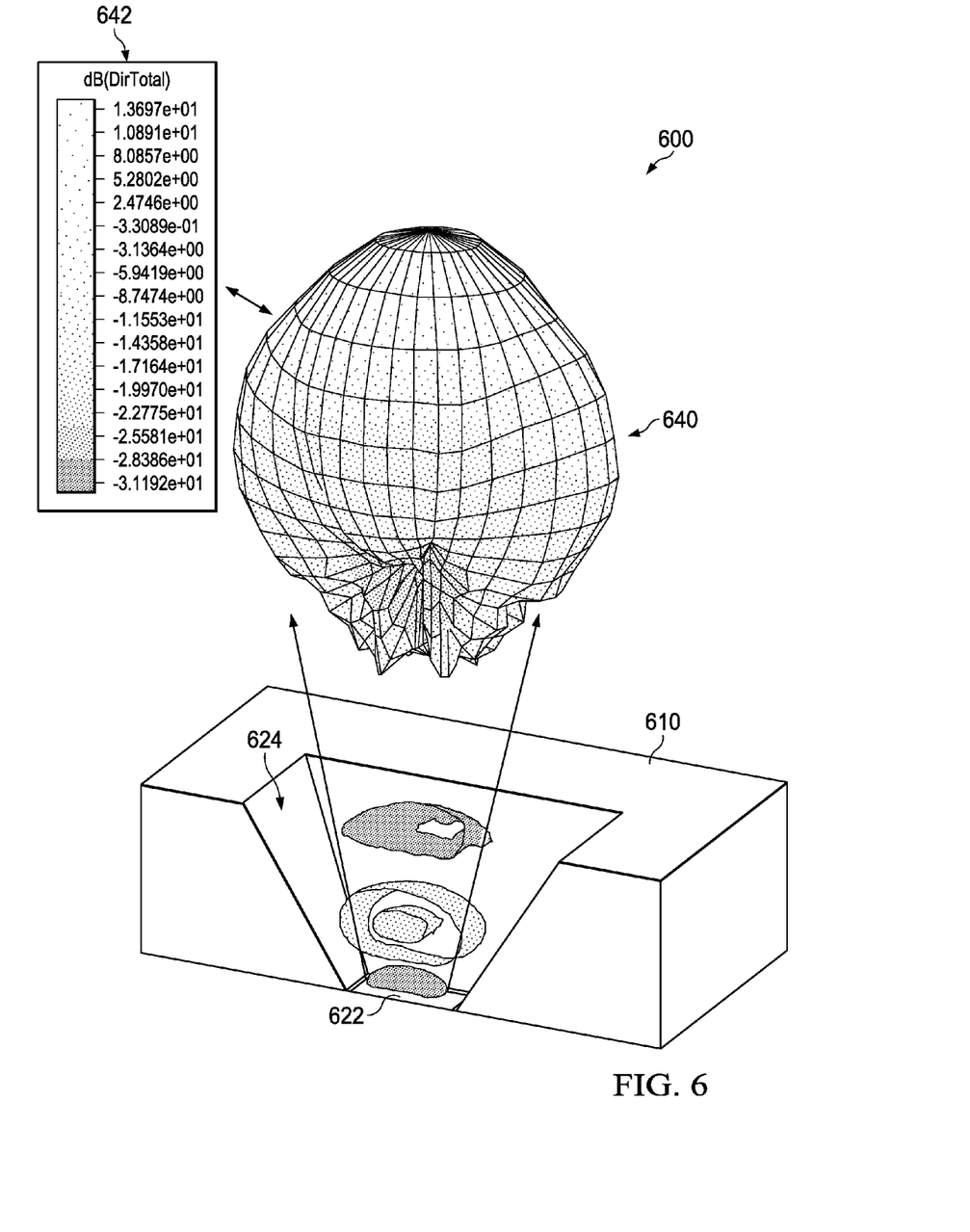
FIG. 6 depicts an antenna and a balloon graph indicating the energy radiated by a backside antenna arrangement.

FIG. 6 depicts in a system 600 an antenna and a balloon graph 640 indicating the energy radiated by a backside antenna. A backside antenna 622 is shown radiating energy through a backside opening or waveguide 624 which was etched in the substrate 610 using known processes. The balloon graph 640 represent the simulated energy radiated by the backside antenna thru the waveguide. In this arrangement, the peak gain was simulated to be approximately 14 dB as indicated by the graph scale 642. In an unexpected result, the signal strength attained by the use of the novel arrangements can be substantially higher than that which can be attained using prior known solutions. For example, as shown in FIG. 3, a prior known solution provides only a signal strength of about 7 dB. Thus the use of the novel arrangements of the present application unexpectedly results in a performance of about twice that of the prior known solutions for the frequencies of interest.

The inventors of the present application contemplate many various arrangements including different cavity openings or waveguide shapes that can be formed on the back side of the semiconductor substrate or wafer. It is expected that the waveguides will be created utilizing the prevailing semiconductor processing techniques that are compatible with the semiconductor wafer used for the antenna. For very high aspect ratio etches, the DRIE (Direct Reactive Ion Etch) process can be used. The DRIE etch can be used as a single etch to form a column style waveguide or in multiple steps with increasing area to form a horn style opening or waveguide. In processes where a sloped waveguide is desired, a cavity or wet etch is a common technique used for that shape. Several non-limiting examples of waveguide shapes and the associated etches are shown in the following figures.

Figure 7A:
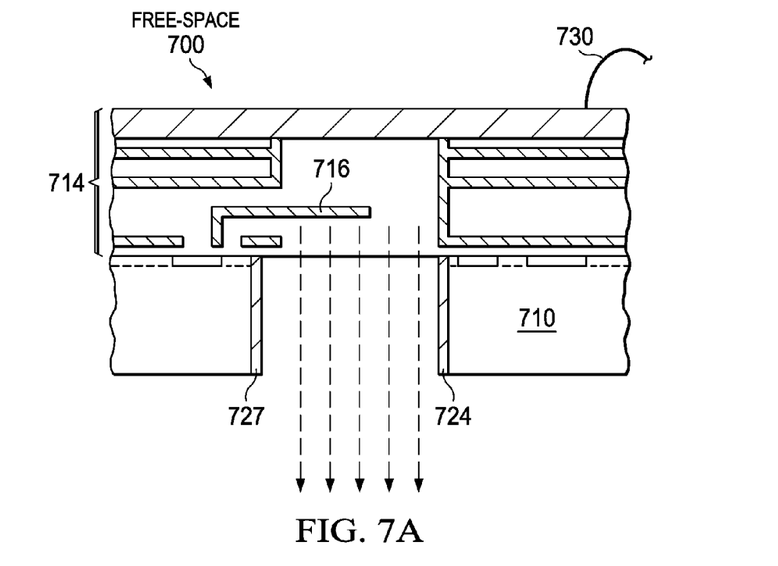
FIGS. 7A, 7B, 7C and 7D depict in different views an antenna and waveguide formed in the backside of a semiconductor substrate to illustrate several example arrangements.

FIGS. 7A-7D depict in cross sectional views an opening or waveguide formed with a DRIE etch and several examples of its use. A portion of an integrated circuit cross section 700 depicted in FIG. 7A contains an antenna structure 716 within the metal structure 714 with a bond wire 730 that protrudes from the top of the metal structure 714. A vertical cavity or waveguide 724 can be etched in the backside of wafer substrate 710 using a known DRIE etch (direct reactive ion etch) process. In some example arrangements, the cavity can be further enhanced by plating with a conductive layer 727 as shown in FIG. 7A using a compatible metallization process. In alternative arrangements that form additional aspects of the present application, the conductive layer 727 can be omitted. The vertical waveguide 724 formed on the backside of the substrate results in improved directionality and gain over prior known front side solutions. Some applications that can be enabled with this aspect of the present application include free-space radiation of the signal, die-to-die signal coupling, inter-die signal coupling, die-to-package and die-to-waveguide signal coupling. Redistribution layers can be formed using these structures for Thz signaling, for example.

Figure 7B:
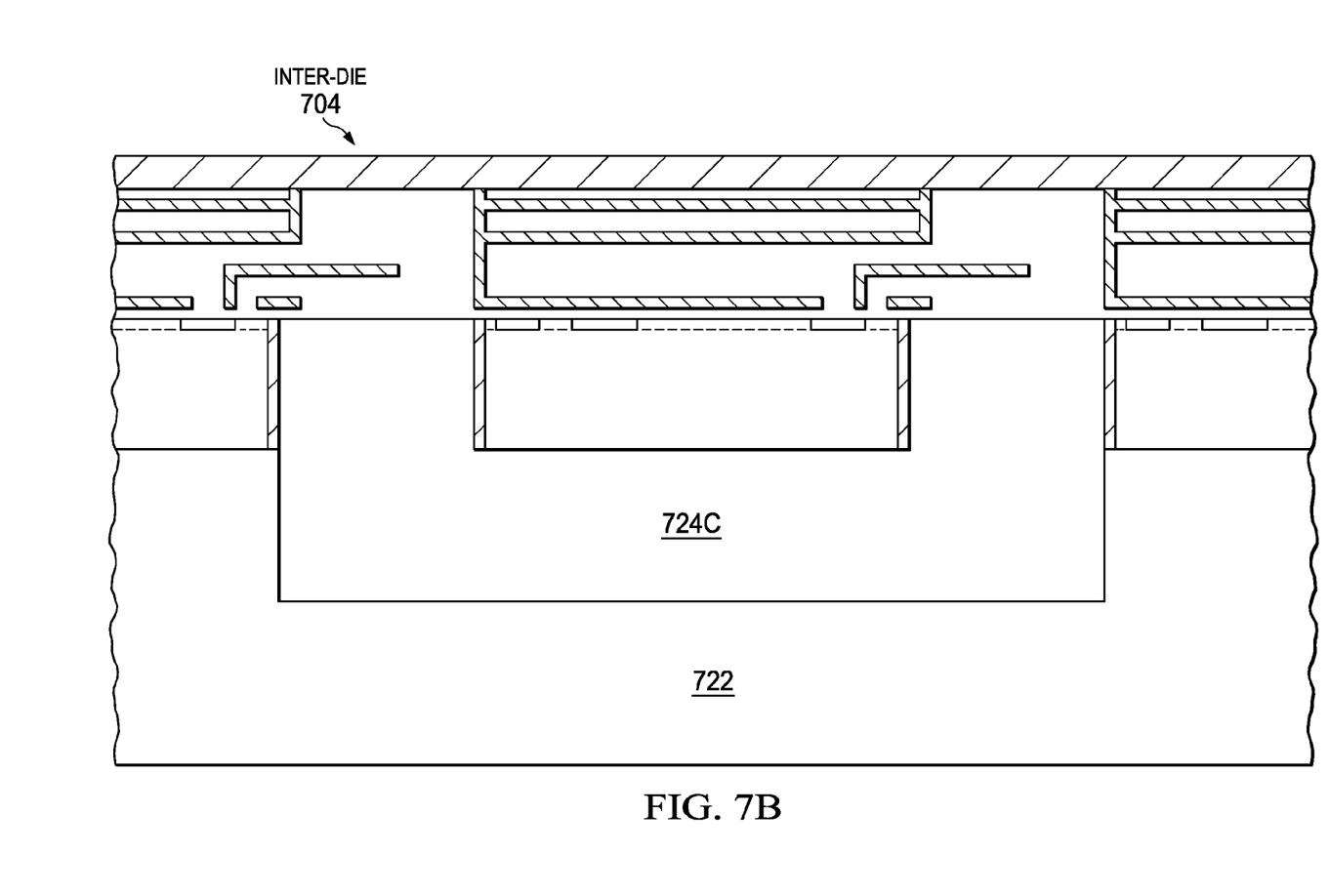

In FIG. 7B, a substrate 722 depicted in cross section 704 represents an inter-die communication waveguide 724c and can be formed after the etch using compatible processing or by waveguides embedded in a portion of a second substrate or other redistribution layer (RDL) 722. As shown in cross section 704, the RDL 722 can be used to route signals from one portion of an integrated circuit or wafer to another portion, allowing for THz signal communications through the waveguide 724c without the need for intervening elements such as optical couplers and the like.

Figure 7C:
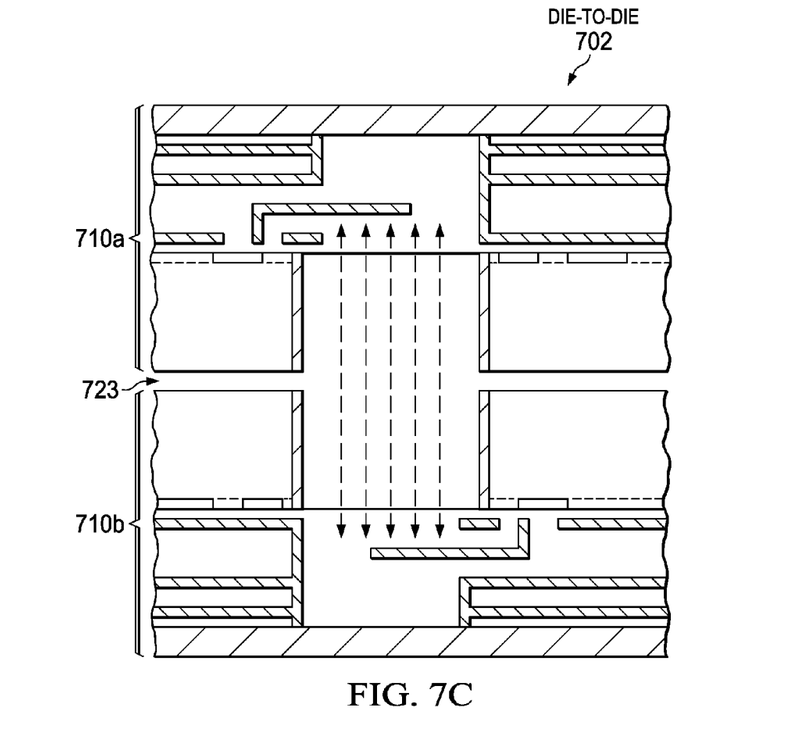

In FIG. 7C, another aspect of the current application is depicted. In this arrangement, use of antennas with backside radiation provides electrical isolation of a pair of dies 720a, 710b from each other, yet allows THz communications between them. The space 723 between the two dies depicted in cross section 702 can be constructed as an isolating air gap. In another example arrangement, the gap 723 may be filled with an insulating material to closely control the antenna spacing while providing electrical isolation between the die pair. In this manner dies that are coupled to different potentials or ground voltages can communicate without being connected to a common potential.

Figure 7D:
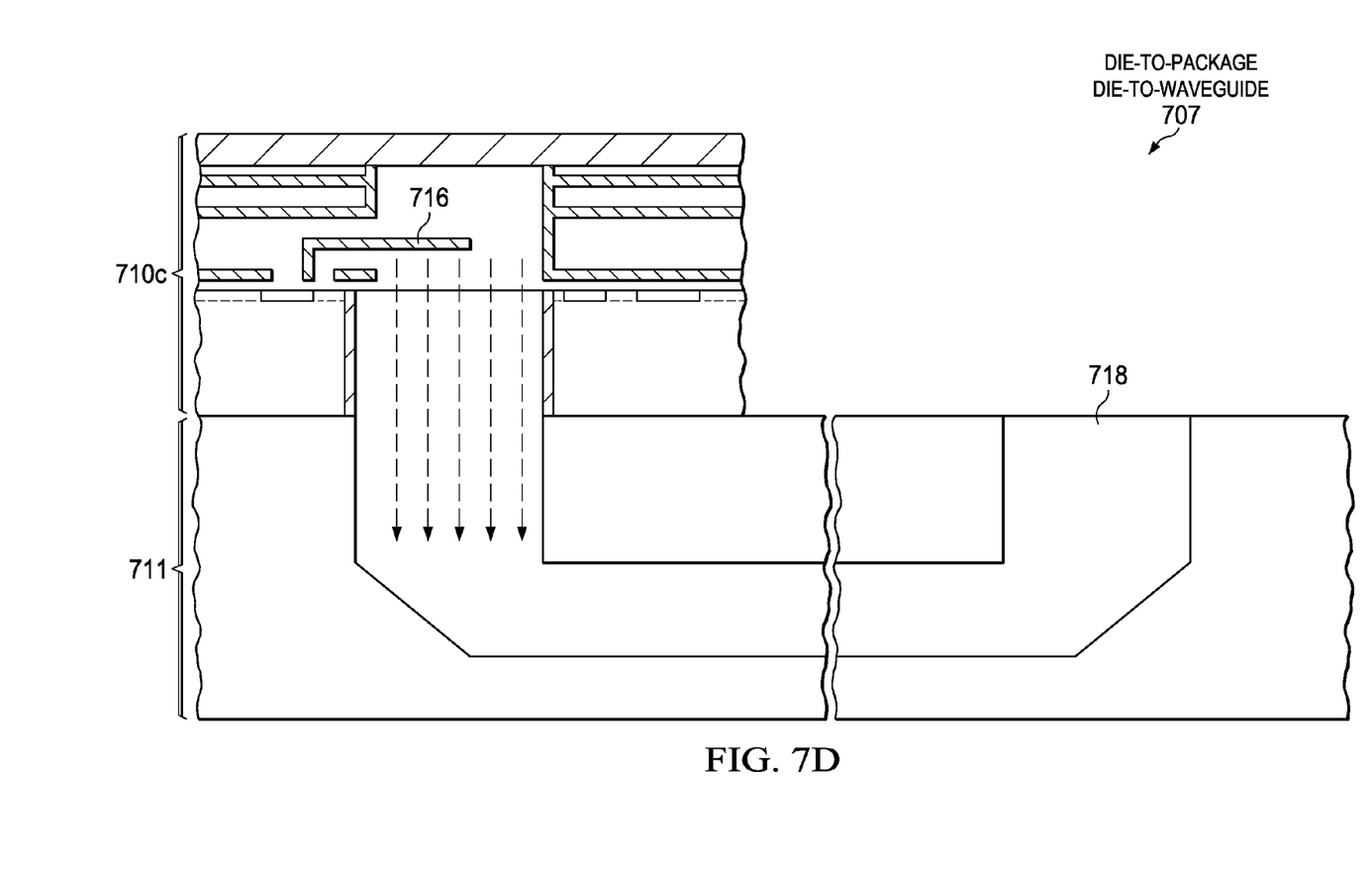

In FIG. 7D another arrangement is depicted in a cross section 706. In this arrangement, a package substrate 711 contains an embedded waveguide 718 which directs the signal from the die 710c with antenna or coupling structure 716 into the waveguide 718 in the substrate 711. Not illustrated at the other end of the substrate waveguide, an antenna or other die coupling structure may receive the signal. Because the arrangements of the present application enable THz frequency signaling, data or communications signals can be readily transmitted from an integrated circuit directly into a waveguide without the need for opto-couplers or other intervening devices.

Figure 8A:
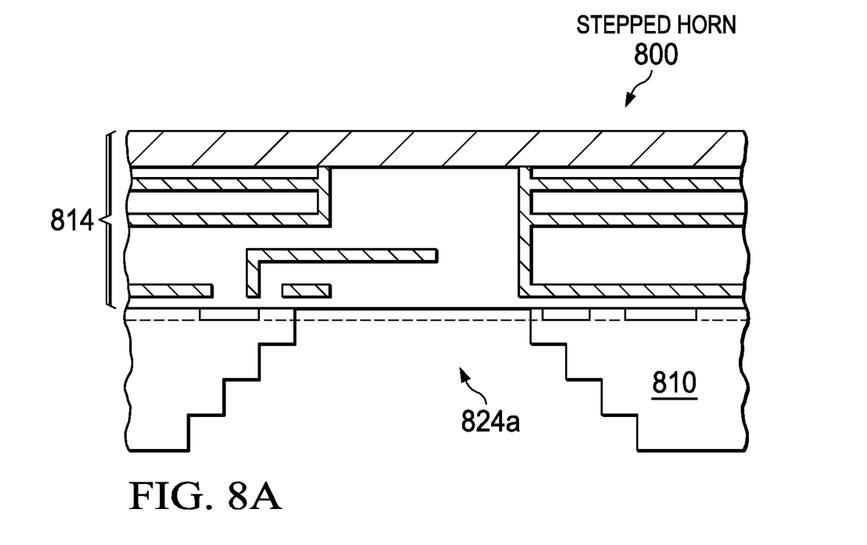
FIGS. 8A, 8B, and 8C depict in cross sectional views additional arrangements for antennas and cavities formed on the backside of a semiconductor substrate.
Figure 8B:
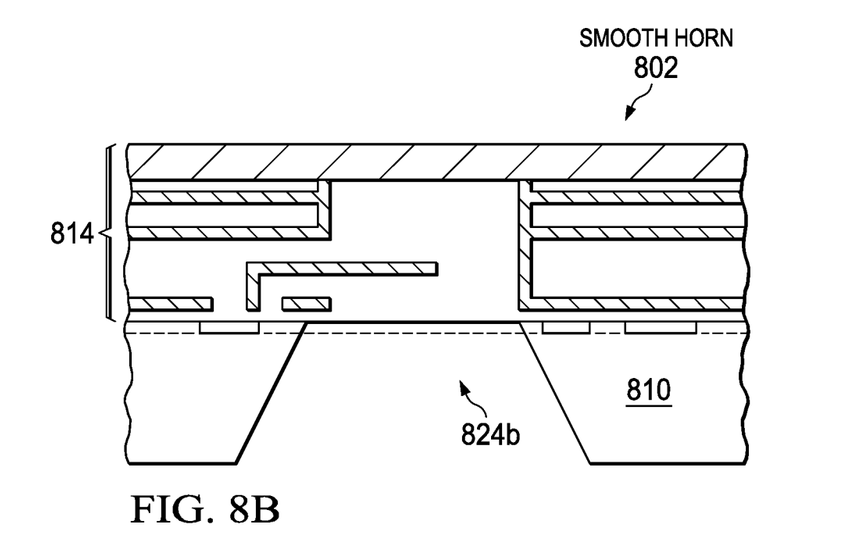
Figure 8C:
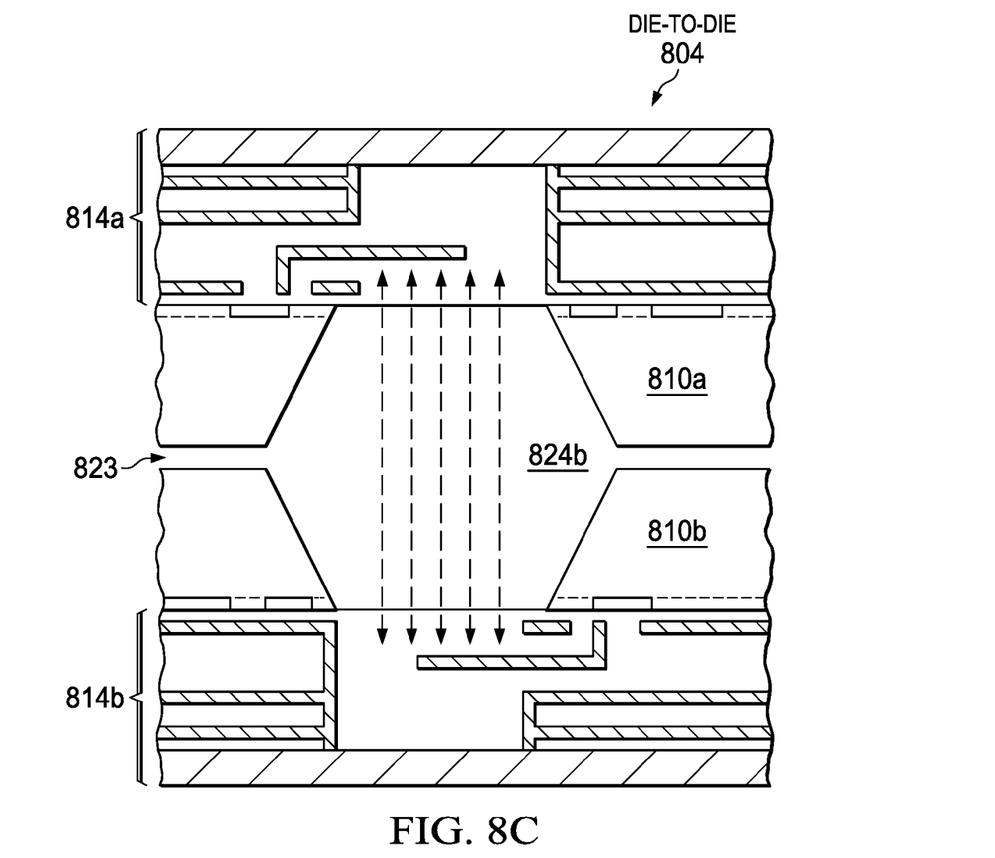

In an alternative arrangement, the waveguide can be a dielectric waveguide; that is, the waveguide 718 can be filled with a dielectric material for constraining and directing the THz frequency signals. For example, as non-limiting alternative arrangements, the waveguide can include low-loss dielectrics such as PTFE, PE, PP, quartz, ceramics, FIGS. 8A-8C depict in cross sectional views additional alternative arrangements for additional waveguide formations on the backside of a substrate or wafer. In FIG. 8A, a portion of a semiconductor substrate 810 which can include active devices is depicted in cross section 800 with the metal stack 814 above the substrate. A stepped waveguide horn 824a is depicted as etched in the backside of the semiconductor substrate 810 using multiple known DRIE etches. For example, a first DRIE etch can provide a shallow opening at the surface of the backside of the substrate. A second DRIE etch that is narrower can then be performed to form a deeper stepped hole within the boundaries of the first opening. The DRIE etches can continue to form the stepped structure 824a.

FIG. 8B illustrates an alternative arrangement in a cross section 802. In another aspect of the present application, a smooth horn waveguide 824b can be etched in the substrate 810 using known wet etch methods as depicted in FIG. 8B. The smooth waveguide or cavity 824b can be used to perform die to die, die to RDL, die to substrate, and die to waveguide coupling, and also for free space radiation, similar to the various coupling methods illustrated in FIGS. 7A-7D.

FIG. 8C illustrates in a cross section 804 another non-limiting example arrangement. In cross section 804 of FIG. 8C, a pair of integrated circuit dies having substrates 810a and 810b and metal structures 814a and 814b are arranged for die-to-die coupling via radiation from their smooth waveguide horns 824b. In FIG. 8C, electrical isolation between the two dies can be achieved by leaving the space between the die 823 filled with air. In another alternative approach, electrical isolation between the dies can be achieved by inserting an insulating material between the die in space 823.

In an example arrangement, an apparatus includes a semiconductor substrate having a front side surface including circuitry and a backside surface opposing the front side surface; a plurality of metal conductors formed over a front side surface of the semiconductor substrate; at least one cavity opening etched in a backside surface of the semiconductor substrate; and a radiator such as a radiating or coupling structure formed in a portion of the metal conductors and configured to radiate signals through the cavity opening in the backside surface.

In an additional arrangement, the apparatus described above is provided and the radiator is formed in a level of the plurality of metal conductors that is a first level overlying the surface of the semiconductor substrate. In a further arrangement, the apparatus above further includes a reflective surface formed spaced from and overlying the radiator, and configured to reflect the signals towards the opening in the backside surface. In a further arrangement, in the above described apparatus, the reflective surface is an electrical reflector. In still another arrangement, in the above described apparatus, the reflective surface reflects the radiated signals with a phase shift of 180 degrees.

In still additional alternative arrangements, in the above described apparatus, the reflective surface is spaced from the radiator by a distance that is a fraction of the wavelength of the radiated signals between $\frac{1}{10}$ and $\frac{1}{2}$ of the wavelength. In still another arrangement, the reflective surface is a magnetic reflector. In a further alternative arrangement, in the above described arrangement, the reflective surface reflects the radiated signals with a phase shift of 0 degrees.

In yet another arrangement, in the above described arrangements, the radiated signals have a frequency between 0.1 THz and 30 THz. In further arrangements, the radiated signals have a frequency of at least about 0.1 THz. In still another alternative arrangement, in the above described apparatus, the cavity opening has sloped sidewalls. In still another alternative arrangement, in the above described apparatus, the semiconductor substrate further comprises a plurality of active devices. In yet further alternative arrangements, in the above described apparatus, the semiconductor substrate further comprises a plurality of metal oxide semiconductor transistors. In yet another alternative arrangement, in the above described arrangements, the cavity opening forms a waveguide for the radiated signals. In additional alternative arrangements, in the above described apparatus, the cavity opening has vertical sidewalls. In still further alternative arrangement, in the above described apparatus, the cavity opening is coated with a conductive material. In further arrangements, in the above described arrangements, the radiator forms an antenna. In still additional arrangements, in the above described apparatus, the antenna is further configured to receive radiated signals. In still another arrangement, in the above described apparatus, the semiconductor substrate is a silicon substrate.

In an additional arrangement that forms an additional aspect of the present application, a method includes forming a backside cavity opening on a backside surface semiconductor substrate proximal to a radiator formed in a metal conductor overlying a front side surface of the semiconductor substrate; and radiating signals having a frequency range between 0.1 THz and about 30 THz from the radiator and out of the backside cavity opening. In still another arrangement, in the above described method, forming a backside cavity opening further includes backgrinding the semiconductor substrate to thin the semiconductor substrate to a predetermined thickness. In yet another arrangement, the above described method includes forming a backside cavity opening further including performing a wet etch to form an opening with sloped sidewalls.

In still another alternative arrangement, in the above described methods, forming the backside cavity opening further comprises performing a KOH wet etch. In yet another alternative arrangement, in the above described methods, forming the backside cavity opening further includes performing a TMAH wet etch. In a further alternative arrangement, in the above described methods, forming the backside cavity further includes performing a wet etch to form an opening with sloping sidewalls.

In still another alternative arrangement, in the above described methods, forming the backside cavity opening further includes performing a deep reactive ion etch. In a further alternative, in the above described methods, the backside cavity opening has vertical sidewalls.

In another arrangement that forms an additional aspect of the present application, a system includes a first integrated circuit having an antenna for radiating THz frequency signals formed in a metal structure overlying the surface of a first semiconductor substrate, and an first opening formed in the backside of the first semiconductor substrate and extending into the semiconductor substrate at a location corresponding to the antenna; and a second integrated circuit having an antenna for receiving THz frequency signals formed in a metal structure overlying the surface of a second semiconductor substrate, and an second opening formed in the backside of the second semiconductor substrate; the first and second openings facing one another and being aligned one to another to facilitate transmission of the THz signals from the first integrated circuit to the second integrated circuit.

In an additional arrangement, in the above described system, a space is provided between the first integrated circuit and the second integrated circuit. In yet another arrangement, in the above described system, an electrical isolation material is disposed between the first integrated circuit and the second integrated circuit. In still another arrangement, in the above described system, the first opening and the second opening further comprise waveguides. In a further arrangement, in the above described system, the first opening and the second opening further comprise openings having sloped sidewalls. In still another arrangement, in the above described system, the first opening and the second opening further comprise openings having vertical sidewalls.

Various modifications can also be made in the order of steps and in the number of steps to form additional novel arrangements that incorporate aspects of the present application, and these modifications will form additional alternative arrangements that are contemplated by the inventors as part of the present application and which fall within the scope of the appended claims.

Although the example illustrative arrangements have been described in detail, it should be understood that various changes, substitutions and alterations can be made herein without departing from the spirit and scope of the present application as defined by the appended claims.

Moreover, the scope of the present application is not intended to be limited to the particular illustrative example arrangements of the process, machine, manufacture, and composition of matter means, methods and steps described in this specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding example arrangements described herein may be utilized according to the illustrative arrangements presented and alternative arrangements described, suggested or disclosed. Accordingly, the appended claims are intended to include within their scope such processes, machines, manufacture, compositions of matter, means, methods, or steps.

What is claimed is:

1. An apparatus, comprising:
    a semiconductor substrate having: a front side surface; including circuitry in a first level; and a backside surface opposite the front side surface;
    a metal conductor stack formed in a second level that is overlying the first level, wherein the second level includes multiple sublevels thereof;
    at least one cavity opening etched in the backside surface and extending into the semiconductor substrate, wherein at least the second level is overlying the cavity opening;
    a structure, formed in a portion of the metal conductor stack, to radiate signals through the cavity opening in the backside surface, wherein the structure is formed in at least one of the sublevels of the second level that is overlying the first level; and
    a reflective surface, overlying and adjacent the second level, and spaced from the structure by at least one of the sublevels of the second level, and configured to reflect the radiated signals towards the cavity opening in the backside surface.

2. The apparatus of claim 1, wherein the reflective surface is an electrical reflector.

3. The apparatus of claim 2, wherein the reflective surface is configured to reflect the radiated signals with a phase shift of 180 degrees.

4. The apparatus of claim 2, wherein the reflective surface is spaced from the structure by a distance that is a fraction of the wavelength of the radiated signals between $1/100$ and $1/2$ of the wavelength.

5. The apparatus of claim 1, wherein the reflective surface is a magnetic reflector.

6. The apparatus of claim 5, wherein the reflective surface is configured to reflect the radiated signals with a phase shift of 0 degrees.

7. The apparatus of claim 1 wherein the radiated signals have a frequency between 0.1 THz and 30 THz.

8. The apparatus of claim 1, wherein the cavity opening has sloped sidewalls.

9. The apparatus of claim 1, wherein the cavity opening forms a waveguide for the radiated signals.

10. The apparatus of claim 1, wherein the cavity opening has vertical sidewalls.

11. The apparatus of claim 1, wherein the cavity opening has a conductive material coating.

12. The apparatus of claim 11, wherein the conductive material coating does not extend onto the backside surface beyond the cavity opening.

13. The apparatus of claim 1 wherein the structure forms an antenna.

14. The apparatus of claim 1, wherein the structure is a radiating structure.

15. The apparatus of claim 1, wherein the structure is a coupling structure.

16. The apparatus of claim 1, wherein the cavity opening has stepped sidewalls.

17. The apparatus of claim 1, wherein at least the first and second levels are overlying the cavity opening.

18. A method, comprising:
    forming a metal conductor stack in a first level that is overlying a front side surface of a semiconductor substrate, wherein the first level includes multiple sublevels thereof, and wherein the front side surface includes circuitry in a second level that is underlying the first level;

forming a backside cavity opening in a backside surface of the semiconductor substrate and extending into the semiconductor substrate, wherein at least the first level is overlying the cavity opening, and wherein the backside surface of the semiconductor substrate is opposite the front side surface of the semiconductor substrate;

in a portion of the metal conductor stack, forming a structure to radiate signals through the backside cavity opening, wherein the structure is formed in at least one of the sublevels of the first level that is overlying the second level; and forming a reflective surface, overlying and adjacent the first level, and spaced from the structure by at least one of the sublevels of the first level, and configured to reflect the radiated signals towards the cavity opening in the backside surface.

19. The method of claim 18, wherein the structure is a radiating structure.

20. The method of claim 18, wherein the structure is a coupling structure.

21. The method of claim 18, wherein the reflective surface is an electrical reflector.

22. The method of claim 21, wherein the reflective surface is configured to reflect the radiated signals with a phase shift of 180 degrees.

23. The method of claim 21, wherein the reflective surface is spaced from the structure by a distance that is a fraction of the wavelength of the radiated signals between 1/100 and 1/2 of the wavelength.

24. The method of claim 18, wherein the reflective surface is a magnetic reflector.

25. The method of claim 24, wherein the reflective surface is configured to reflect the radiated signals with a phase shift of 0 degrees.

26. The method of claim 18 wherein the radiated signals have a frequency between 0.1 THz and 30 THz.

27. The method of claim 18, wherein the backside cavity opening has sloped sidewalls.

28. The method of claim 18, wherein the backside cavity opening forms a waveguide for the radiated signals.

29. The method of claim 18, wherein the backside cavity opening has vertical sidewalls.

30. The method of claim 18, wherein the backside cavity opening has stepped sidewalls.

31. The method of claim 18, wherein the backside cavity opening has a conductive material coating.

32. The method of claim 31, wherein the conductive material coating does not extend onto the backside surface beyond the backside cavity opening.

33. The method of claim 18 wherein the structure forms an antenna.

34. The method of claim 18, wherein at least the first and second levels are overlying the backside cavity opening.

35. The method of claim 18, wherein forming the backside cavity opening further comprises:

backgrinding the semiconductor substrate to thin the semiconductor substrate to a predetermined thickness.

36. The method of claim 18, wherein forming the backside cavity opening further comprises performing a wet etch to form an opening with sloped sidewalls.

37. The method of claim 18, wherein forming the backside cavity opening further comprises performing an etch that is one selected from the group consisting essentially of a KOH wet etch, a TMAH etch, and a deep reactive ion etch.

38. A system, comprising:

a first integrated circuit including: a first antenna for radiating THz frequency signals, formed in a first metal conductor stack in a first level that is overlying a front side surface of a first semiconductor substrate, wherein the first level includes multiple sublevels thereof, and wherein the first antenna is formed in at least one of the sublevels of the first level; a first opening formed in a backside of the first semiconductor substrate and extending into the first semiconductor substrate at a location corresponding to the first antenna, wherein the first level is overlying the first opening; and a first reflective surface, overlying and adjacent the first level, and spaced from the first antenna by at least one of the sublevels of the first level, and configured to reflect the radiated THz frequency signals towards the first opening in the backside of the first semiconductor substrate; and a second integrated circuit including: a second antenna for receiving the THz frequency signals, formed in a second metal conductor stack in a second level that is overlying a front side surface of a second semiconductor substrate, wherein the second level includes multiple sublevels thereof, and wherein the second antenna is formed in at least one of the sublevels of the second level; and a second opening formed in a backside of the second semiconductor substrate and extending into the second semiconductor substrate at a location corresponding to the second antenna, wherein the second level is overlying the second opening;

the first and second openings facing one another and being aligned to one another to facilitate transmission of the THz frequency signals from the first integrated circuit to the second integrated circuit.

* * * * *